FIP8102 XR 3,415,947

TX5220E

Dec. 10, 1968 C. R. ABBEY ETAL 3,415,947

DATA CHANNEL MONITOR

Filed Feb. 24, 1965 2 Sheets-Sheet 1

INVENTORS
CHARLES R. ABBEY
HARRY H. PURSEL

BY Bruce C. Lutz

ATTORNEY

3415947
OR IN 178/69G

Dec. 10, 1968 C. R. ABBEY ET AL 3,415,947

DATA CHANNEL MONITOR

Filed Feb. 24, 1965 2 Sheets-Sheet 2

INVENTORS
CHARLES R. ABBEY
HARRY H. PURSEL

BY Bruce C. Lutz

ATTORNEY

United States Patent Office 3,415,947

Patented Dec. 10, 1968

3,415,947

DATA CHANNEL MONITOR

Charles R. Abbey and Harry H. Pursel, Seattle, Wash., assignors to Honeywell Inc., Minneapolis, Minn., a corporation of Delaware Filed Feb. 24, 1965, Ser. No. 434,844
11 Claims. (Cl. 178—69)

ABSTRACT OF THE DISCLOSURE

A characterizing means produces a plurality of characterized low level signals which are combined with the data signal and transmitted over a data link to a receiver. In the receiver, detection means are utilized to separate the characterized signals of different frequencies from each other and from the transmitted data. These signals are then decharacterized and compared to project an indication of the data link characteristics.

This invention relates generally to communications apparatus and is more particularly directed to a method and apparatus for monitoring the operation of a data channel.

As one example of the prior art with which our invention is concerned, reference is made to a co-pending application entitled Data Channel Monitor filed Sept. 28, 1964 under Ser. No. 399,683 in the names of Abbey, Pursel, and Scidmore and assigned to the assignee of the present invention. In the co-pending application, a data channel monitor and method of monitoring are presented in which a continuous monitoring of a data channel, whether occupied or unoccupied with the transmission of a data signal, is provided and in which a spread spectrum "probe" signal is transmitted through a data channel in a non-interfering, continuous manner. In the co-pending application, the signal to be transmitted is applied to a data channel so as to be "noise-like" in character with respect to the data normally transmitted over the channel and is further transmitted at a low level of amplitude. It is intended that the monitoring, "probe," signal may be present at all times to provide an indication of the status and instantaneous parametric characteristics of a data channel.

The present invention is concerned with improvements over the co-pending application to provide an accurate indication of the status and translational characteristics of a data channel over its band width. Briefly, this is accomplished by providing a plurality of signals, each having a different predetermined frequency distributed across the band width of a data channel. The signals are suitably characterized and transmitted through a data channel to a receiver where a de-characterization, or demodulation is effected and the plurality of signals of different frequency are recovered and suitably compared.

It is therefore an object of our invention to provide improved data channel monitoring apparatus.

A further object of our invention is to provide an improved method of monitoring a data channel.

Another object of our invention is to provide improved apparatus for determining and measuring the differential delay, amplitude, and translational characteristics of a data channel.

A still further object of our invention is to provide an improved method of measuring the differential delay, amplitude, and translational characteristics of the data channel.

A still further object of our invention is to provide improved data channel monitoring apparatus which may be continuously operable in a data channel without interfering with the transmission of data signals therethrough.

Figure 2B:
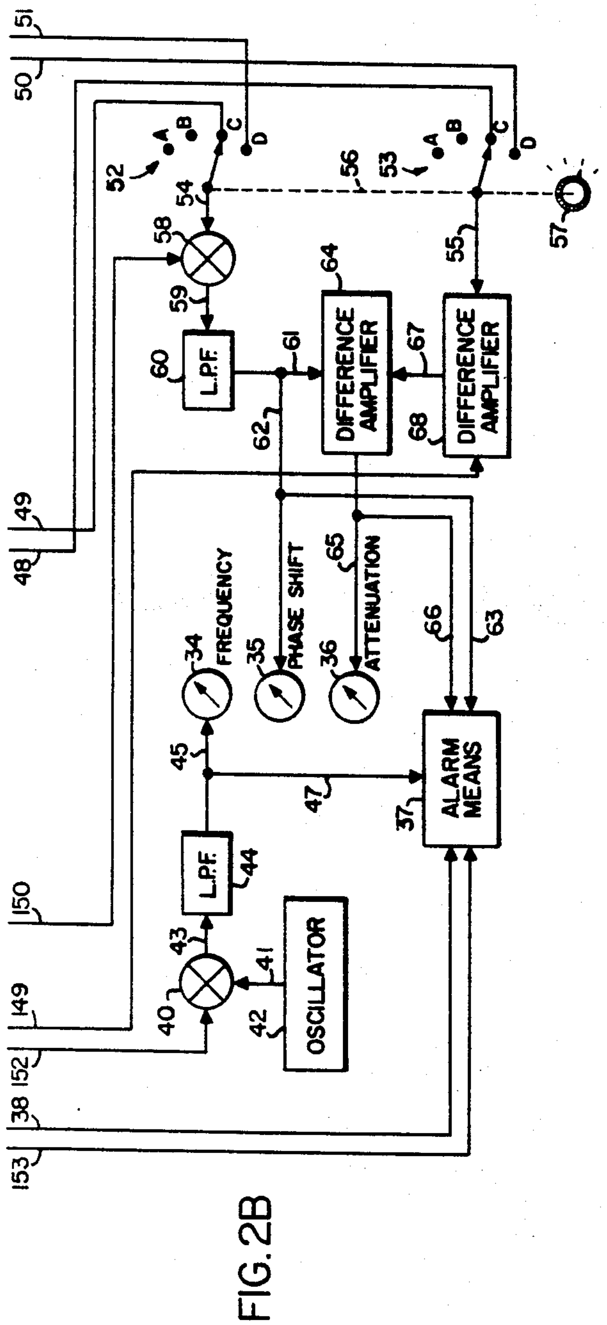
Figure 1:
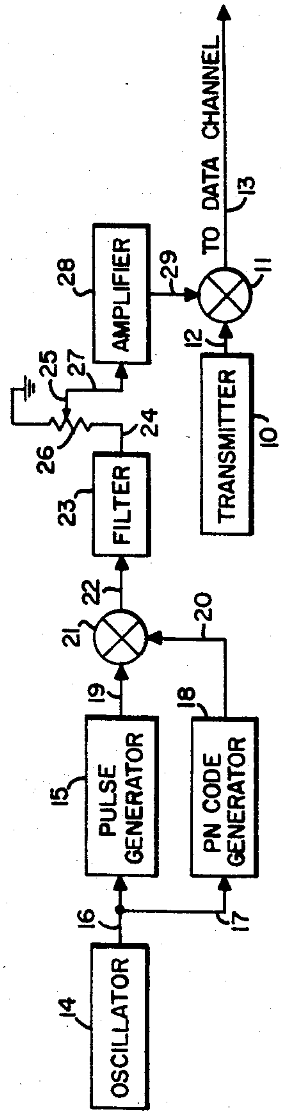
Figure 2A:
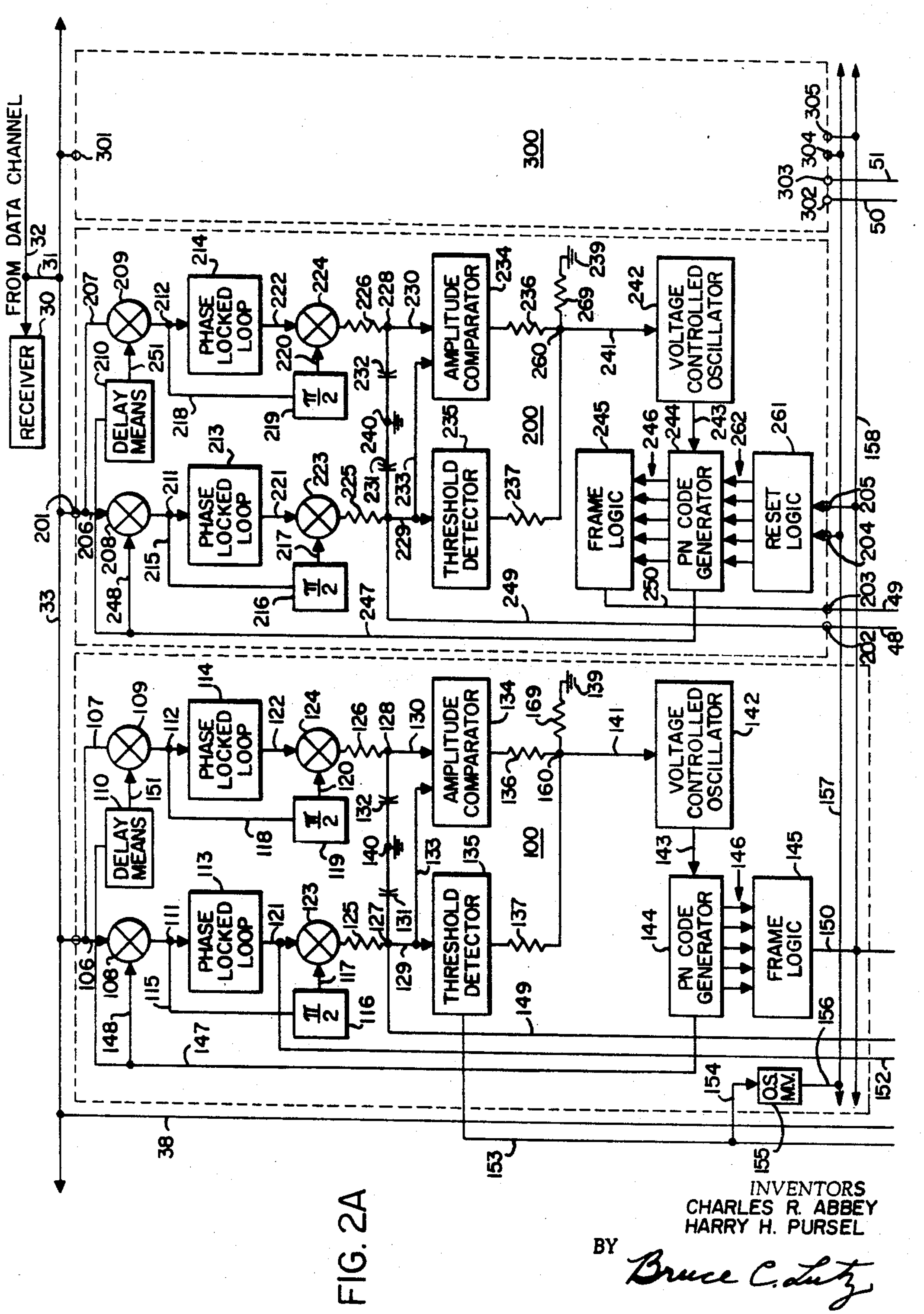

These and other objects of our invention will become apparent from a consideration of the appended specification, claims, and drawing in which:

FIGURE 1 is a block diagrammatic representation of the transmitter terminal of a data channel to which a preferred embodiment of our invention has been applied; and FIGURES 2A and B represent a block diagrammatic and schematic illustration of the receiver terminal of a data channel incorporating a preferred embodiment of our invention.

Referring now to FIGURES 1, 2A, and 2B of the drawings, it may be seen that a typical data channel, as found in communications systems, may be comprised of a transmitter 10 which is connected to a data channel (not shown) through conductor 12, adder 11, and conductor 13. A receiver 30 is shown connected to the data channel through a conductor 32 and provides an output to a conductor 33 through conductor 31. A received data signal comprised of several components, including the data channel monitoring signal, is present on conductor 33 which may in turn be connected to suitable data signal utilization means (not shown). As will be explained in greater detail below, transmitter 10 performs its usual function in supplying a data signal to be transmitted through a data channel to receiver 30. In addition to the data signal, a monitoring "probe" signal is, or may be, continuously transmitted through the data channel to the receiver to perform the several functions described below.

In FIGURE 1 a continuous, non-interfering, noise-like signal is supplied to adder 11 through conductor 29. The signal, which is conveniently referred to as a "probe" signal, is provided by the conjoint operation of oscillator 14, pulse generator 15, pseudo-random (PN) code generator 18, and multiplier 21. Oscillator 14 is shown connected to pulse generator 15 through conductor 16 and to pseudo-random code generator 18 through conductor 17. Multiplier 21 is shown connected to pulse generator 15 through conductor 19 and to PN code generator 18 through conductor 20. The output of multiplier 21 is supplied to a low pass filter 23 through conductor 22. Filter 23 is connected to a suitable amplifier 28 through conductor 24, potentiometer winding 26, potentiometer wiper 25 and conductor 27. The output of amplifier 28 consists of a composite, spread spectrum, pseudo-random coded "probe" signal having a plurality of frequency components distributed across a predetermined band width of frequencies related to the normal band width of the data channel described above.

In one operative embodiment of our invention, oscillator 14 was comprised of a 535 c.p.s. tuning fork oscillator. Pulse generator 15 was comprised of a one-shot multi-vibrator with an output having a period of 1.87 milli-seconds and a pulse width of 0.1 milli-seconds. PN code generator 18, which may be of the general class of apparatus described in Error Correction Codes by W. W. Peterson published 1961 by the MIT Press and John Wiley and Sons, was designed to provide a 15-bit pseudo-random code. The code generator may also have a period of 28 milli-seconds with a pulse width of 1.87 milli-seconds. The output of pulse generator 15 has a $\sin^2 X/X^2$ spectrum having lines spaced at 535 cycles per second and first cross-over at ten kilocycles. PN code generator 18 also has a $\sin^2 X/X^2$ spectrum having lines spaced at 35.7 cycles per second and a first cross-over at 535 cycles per second.

Multiplier 21 serves to provide a phase-shift keying of the output of pulse generator 15 to result in an output having a $\sin^2 X/X^2$ spectrum with lines every 35.7 cycles per second and a first cross-over at 10 kilocycles. The output of multiplier 21 is connected to low pass filter 23 which is adapted to cut-off substantially at 3 kilocycles to limit the band width of the spectrum to provide a spectrum that is centered at approximately 1605 cycles per second. The "probe" signal then has approximately 84 frequency components distributed across a band width of 3 kilocycles. The amplitudes of each of the frequency components are substantially equal since they are derived coherently from the same frequency standard, oscillator 14. The potentiometer connected intermediate filter 23 and amplifier 28 may be utilized to adjust the output of amplifier 28 to a suitable signal level so as to provide a low level non-interfering transmission of the "probe" signal appearing at conductor 29 through the remainder of the data system. Normally, operation at a level approximately 22 db below the nominal RMS data level in the data channel will provide satisfactory operation with no substantial interference with respect to the data signal that may be present in the channel.

A consideration of the values set forth above will indicate that the operation of the illustrated embodiment of our invention was obtained with a telephone channel. It is generally recognized that a signal at a frequency essentially centered in the normal band of frequencies for which the channel is designed, will be transmitted through a given channel with the least amount of phase delay or amplitude attenuation due to the channel characteristics. Furthermore, signals of frequencies on either side of the center frequency are modified by the characteristics of the channel in a manner that is substantially symmetrical about the mid-frequency of the channel with the exception of frequency translation which is uniform across the bandwidth of interest. In practicing our invention, therefore, the center frequency of the spread-spectrum of frequencies distributed across the band width of the channel under consideration may be utilized as a reference with which the remainder of the frequency components of the transmitted "probe" signal may be compared to define the instantaneous operating characteristics of the channel.

*Receiver*

Referring now to FIGURES 2A and 2B of the drawings, a signal from the data channel (not shown) is supplied to a conventional receiver 30 through conductor 32. A signal bus, 33, is also connected to conductor 32 through conductor 31 and a composite signal including any data signal transmitted through the data channel and the "probe" signal may be present on bus conductor 33. Conductor 33 is indicated as extending in both directions from the portion shown for connection to further "probe" signal processing apparatus and to further data signal processing apparatus (not shown) as may be required from the nature of the data transmission system.

In the center of FIGURE 2A there are shown a plurality of modules 100, 200, and 300 enclosed in dotted outline. Module 100 is adapted to select, acquire, and track the center frequency component of the multi-frequency "probe" signal, and to provide outputs representative of frequency, amplitude and phase of that signal component. Modules 200 and 300 may be identical and are representative of a plurality of like, corresponding modules each of which is operable to select, acquire, and track a particular side frequency component in the "probe" signal. It may now be apparent to those skilled in the art that the center frequency component of the "probe" signal is utilized as a reference signal after suitable processing in module 100 and that the other side frequency components of the "probe" signal are tracked by a like, corresponding, number of modules as for example modules 200 and 300 shown on FIGURE 2A.

Module 200 is shown having a "probe" signal input terminal 201, an amplitude signal output terminal 202, a phase signal output terminal 203, a reset signal input terminal 204, and a synchronizing signal input terminal 205. Module 300 is shown provided with like corresponding terminals designated respectively as "probe" signal input terminal 301, amplitude signal output terminal 302, phase signal output terminal 303, reset signal input terminal 304, and synchronizing signal input terminal 305.

To avoid unnecessary duplication, the internal circuitry of module 200 is shown in detail while module 300 is indicated only by the dotted outline and the corresponding respective terminals recited above. It should be clear to those skilled in the art with which our invention is concerned, that a plurality of modules constructed as shown on module 200 will be required in accordance with the number of symmetrically related side frequency components present in the "probe" signal as disposed about the center frequency component thereof.

Module 200 is shown having a pair of input conductors 206 and 207 connected to input terminal 201. Conductor 206 is connected to a ground terminal 239 through a multiplier 208, a conductor 211, a phase lock-loop 213, conductor 221, a multiplier 223, resistor 225, terminal 227, conductor 229, threshold detector 235, resistor 237 and resistor 269. Conductor 211 is also connected to multiplier 223 through conductor 215, phase shifter 216 and conductor 217. Terminal 227 is shown connected to ground terminal 240 through an integrating capacitor 231. Conductor 229 is shown connected to an amplitude comparator 234 through conductor 233. Amplitude comparator 234 is shown connected to ground terminal 239 through resistor 236 and resistor 269.

In a similar manner, conductor 207 is connected to ground terminal 239 through multiplier 209, conductor 212, phase lock loop 214, conductor 222, multiplier 224, resistor 226, terminal 228, conductor 230, amplitude comparator 234, resistor 236 and resistor 260. Conductor 212 is also connected to multiplier 224 through conductor 218, phase shifter 219 and conductor 220. An integrating capacitor 232 is shown connected intermediate terminal 228 on conductor 230 and ground terminal 240.

Terminal 260 is connected to multiplier 209 through conductor 241, voltage controlled oscillator 242, conductor 243, pseudo-random (PN) code generator 244, conductor 247, delay means 210 and conductor 251. Conductor 247 is shown directly connected to multiplier 208 through conductor 248.

PN code generator 244 is shown having a plurality of output conductors 246 connected to frame logic means 245. Frame logic means 245 is connected to phase output terminal 203 through conductor 250. Amplitude output terminal 202 is shown connected to terminal 227 through conductor 249. Reset terminals 204 and 205 are connected to reset logic means 261 which is in turn connected to PN code generator 244 through conductor 262.

Center frequency tracking module 100 is shown having a pair of input conductors 106 and 107 connected to signal bus conductor 33. Conductor 106 is connected to ground terminal 139 through multiplier 108, conductor 111, phase locked loop 113, conductor 121, multiplier 123, resistor 125, terminal 127, conductor 129, threshold detector 135, resistor 137, terminal 160 and resistor 169. Conductor 111 is connected to multiplier 123 through conductor 115, phase shifter 116 and conductor 117. Terminal 127 is connected to ground terminal 140 through integrating capacitor 131. Conductor 129 is also connected to ground terminal 139 through conductor 133, amplitude comparator 134, resistor 136, terminal 160 and resistor 169.

Conductor 107 is connected to ground terminal 139 through multiplier 109, conductor 112, phase lock loop 114, conductor 122, multiplier 124, resistor 126, terminal 128, conductor 130, amplitude comparator 134, resistor 136, terminal 160 and resistor 169. Conductor 112 is connected to multiplier 124 through conductor 118, phase shifter 119 and conductor 120. Terminal 128 is connected to ground terminal through integrating capacitor 132.

Terminal 160 is shown connected to multiplier 109 through conductor 141, voltage controlled oscillator 142, conductor 143, pseudo-random (PN) code generator 144, conductor 147, delay means 110 and conductor 151. Conductor 147 is also connected to multiplier 108 through conductor 148.

Pseudo-random code generator 144 is connected to frame logic means 145 through a plurality of conductors 146. Frame logic means 145 is connected to a synchronizing signal bus 158 through conductor 150.

Threshold detector 135 is also connected to a reset bus conductor 157 through conductor 153, conductor 154, one-shot multi-vibrator 155 and conductor 156.

The frequency translation of the data channel may be indicated on suitable indicating means, shown as meter 34. Meter 34 is connected to a multiplier 40 through conductor 45, low pass filter 44 and conductor 43. Multiplier 40 is connected to the output of phase locked loop 113 through conductor 152 and to a local oscillator 42 through conductor 41. The output of low pass filter 44 is also connected to an alarm means 37 through conductor 47. Alarm means 37 is also shown connected to signal bus conductor 33 through conductor 38 and threshold detector 135 through conductor 153.

A phase shift indicator, shown as meter 35, is connected to a multiplier 58 through conductor 62, conductor 61, low pass filter 60 and conductor 59. Multiplier 58 is connected to frame logic 145 in center frequency module 100 through conductor 150. Multiplier 58 is also connected to the movable contact on switch assembly 52 through conductor 54. Switch assembly 52 is provided with a plurality of contacts, 52A, B, C, and D. Stationary contact 52C is shown connected to phase output terminal 203 on module 200 through conductor 49. Stationary contact 52D is shown connected to phase output 303 on module 300 through conductor 51. Conductor 62 is also connected to alarm means 37 through conductor 63.

An attenuation indicating means, shown as meter 36, is connected to difference amplifier 64 through conductor 65. Difference amplifier 64 is connected to low pass filter 60 through conductor 61 and to a further difference amplifier, 68, through conductor 67. Difference amplifier 68 is shown connected to terminal 127 on center frequency module 100 through conductor 149. Difference amplifier 68 is also connected to the movable contact on switch assembly 53 through conductor 55. Switch assembly 53 is shown having a plurality of stationary contacts, 53A, B, C, and D. Contact 53C is shown connected to amplitude output terminal 202 on module 200 through conductor 48. Stationary contact 53D is shown connected to amplitude output terminal 302 on module 300 through conductor 50. Conductor 65 is also connected to alarm means 37 through conductor 66. The movable contacts on switch assemblies 52 and 53 are shown connected to a knob actuator 57 through driving means 56 for actuation thereby to selectively compare the outputs of module 100 with the outputs of each of the other modules present in a complete system. It is anticipated that in the embodiment set forth in this specification, stationary contacts 52A and B and stationary contacts 53A and B will be connected to further modules (not shown) similar to modules 200 and 300.

While the operation of the several components illustrated in FIGURES 2A and B will become apparent to those skilled in the art upon becoming familiar with the description of operation set forth below, the following brief descriptions may prove to be helpful for a complete understanding of our invention.

With specific reference to modules 100 and 200, the delay means 110 and 210 are provided to effect a one bit delay between the signals applied to multipliers 108 and 109 and 208 and 209 respectively. Phase locked loops 113 and 114 may be constructed according to the well known principles concerning phase locked loops and are designed to operate at a nominal frequency substantially that of the center frequency component of the "probe" signal. In a similar manner, each of the phase locked loops in module 200 and those corresponding thereto in module 300 and any other modules present in the system, are constructed to operate at substantially the frequency of the particular side frequency component of the "probe" signal that is to be tracked for comparison with the center frequency component. Amplitude comparators 134 and 234 are designed to provide an output at terminal 260 that is proportional to the difference between the signals appearing at terminals 127 and 128, and 227 and 228, respectively, in modules 100 and 200. The difference between the potentials is utilized to control the voltage controlled oscillator 142 and 242 respectively. Threshold detectors 135 and 235 include suitable means (not shown) for providing an input potential of predetermined magnitude to terminals 160 and 260 until such time as the potential at terminals 127 and 227 exceeds a predetermined value. Threshold detector 135 is also adapted to provide an output to one-shot multivibrator 155 which in turn is adapted to provide a single reset pulse to the several other modules present in the system.

The pseudo-random (PN) code generators 144 and 244 are intended to be similar in operation and to provide the same code as provided by PN code generator 18 in the apparatus associated with transmitter 10 on FIGURE 1 of the drawing. Frame logic means 145 and 245 may be designed to respond to the output of PN code generators 144 and 244 to provide a symmetrical square wave for each 15 bit frame generated by the PN code generators.

Block 261 labeled reset logic on module 200 is provided to accept the frame logic, or phase signal, from logic means 145 in module 100.

Multipliers 108, 109, 208 and 209 may be of the type shown in FIGURE 3 of the above referred to copending application, and which are of the general type known to those skilled in the art as modulo-two adders, or one of the many forms of suitable devices which may be operative to multiply a PN coded "probe" signal with a PN code of similar characteristics to remove the code from the signal. In like manner multipliers 123, 124, 223, and 224 may be selected from the class of devices which will provide a maximum direct current output in accordance with a 90° phase relationship between two signals of the same frequency.

Difference amplifier 68 may be any one of many common forms of amplitude comparing amplifiers. Difference amplifier 64 may conveniently be provided with means (not shown) for weighting the input supplied from low pass filter 60. The weighting factor may be a constant one and may easily be determined upon becoming familiar with the general operating characteristics of our invention. Alarm means 37 may be provided with suitable amplitude responsive indicators for providing a visual or audible alarm when the signals applied thereto are of a particular predetermined magnitude.

*Operation*

Referring again to the drawings, a "probe" signal having a plurality of frequency components, each characterized by the PN code generator 18 is supplied to a data channel from the output of adder 11 and through conductor 13. The signal includes a reference component substantially at the center of the band of frequencies which the data channel (not shown) is designed to transmit. The "probe" signal also contains a plurality of side frequency components which may be complementary disposed with respect to the center frequency component. The signal is received from the data channel and will appear on conductor 33.

The apparatus shown in FIGURES 2A and B is designed to detect, acquire, and track each of the individual frequency components of the "probe" signal and to selectively compare the side frequency components with the center frequency component to provide an indication of phase shift, or delay and attentuation of the individual side frequency components after transmission through the data link. Such comparisons may conveniently be displayed for observation by an operator or the signals provided by such comparisons may be used to control suitable automatic equalization apparatus (not shown) in accordance with the deviations of the side frequency components from the center frequency component of the "probe" signal.

In the illustrative embodiment, module 100 is designed to detect, acquire, and track the center frequency component of the "probe" signal before the remainder of the side frequency mdoules. As noted above, one operative embodiment of our invention utilizes a probe signal to cover a band width of three thousand cycles in a telephone type channel. The signal may be comprised of approximately 84 frequency components. After demodulation by multipliers 108, 109, 208, 209, etc., the input signal to each of the phase locked loops may be comprised of five frequency components having frequencies, of, for example, 535, 1070, 1605, 2140, and 2675 c.p.s. The 1605 c.p.s. signal is the center frequency component or reference component in the "probe" signal. It may thus be seen that phase locked loops 113 and 114 in module 100 will be designed to be operative at a nominal frequency of 1605 c.p.s. Further, the voltage controlled oscillator 142 will be provided with an input potential from threshold detector 135 to operate at nominal frequency to drive PN code generator 144 at a slightly higher frequency than that of PN code generator 18 associated with transmitter 10. At the time the "probe" signal is first applied to conductor 33 the potential appearing at terminals 127 and 128 is generally of a low magnitude due to the lack of frequency coincidence between the internal voltage controlled oscillator (not shown) of the locked loops 113 and 114 and the demodulated center frequency component in the "probe" signal appearing on conductors 111 and 112. As frequency synchronism is approached, the output of multipliers 123 and 124 increases in magnitude and the potential appearing at terminals 127 and 128 and across integrating capacitors 131 and 132 will begin to increase to a level which will trigger threshold detector 135 to remove the potential supplied to voltage controlled oscillator 142 which in turn allows the frequency of PN code generator 144 to approach that of PN code generator 18 to further increase the magnitude of the potential appearing at terminals 127 and 128.

The delay effected by delay means 110 establishes the proper relationship between the magnitude of the potentials appearing at terminals 127 and 128 so that when the magnitude is equal, the desired center frequency component is being tracked at a point midway between the signals applied from the PN code generator 144 to multipliers 108 and 109. Differences in magnitude in one direction or the other provides potential of predetermined magnitude at terminal 160 for use in controlling the frequency of voltage controlled oscillator 142. When PN code generator 144 is in synchronism with the code output of PN code generator 18 as received on conductor 32, a signal, which is used in the illustrated embodiment of our invention as a reference signal, that is related to the amplitude of the frequency component is present at terminal 127. A further signal that is related to the frequency of the frequency component reference signal is present on conductor 121. Another signal that is related to the phase of the frequency component reference signal is present on conductor 150.

To review, the voltage controlled oscillator 142 connected to PN code generator 144 is initially operative, due to the potential supplied from threshold detector 135, at a somewhat higher frequency than the PN code generator 18 which was used to characaterize the center frequency component of the 'probe" signal. As the frequency of phase locked loop 113 approached that of the frequency of the center frequency component of the "probe" signal, an increase in the potential appearing at 127 caused the threshold detector 135 to remove the "off-set" potential from voltage controlled oscillator 142 to allow a signal derived from the difference in potential between terminals 127 and 128 to control the frequency of voltage controlled oscillator 142 to allow the code output from PN code generator 144 to assume synchronism with the code output of code generator 18 as received. This then provided the tracking of the center frequency component of the "probe"signal so that, in the illustrated embodiment using a one bit delay for delay means 110, the desired center fresuency component was positioned one half-bit between the PN code signals applied to multipliers 108 and 109 respectively. At this time each of the phase locked loops 113 and 114 were locked to the center frequency component which may be slightly different from the transmitted signal frequency.

As noted above, as the time module 100 starts tracking the center frequency component, one shot multivibrator 155 is operative to provide a pulse to conductor 157 which is in turn connected to each of the other side frequency modules, 200, 300 etc., to provide a synchronizing signal, derived from PN code generator 144 through frame logic means 145, to each of the PN code generators in the side frequency component detecting modules. In FIGURE 2A, PN generator 244 is, at that time, synchronized in phase with PN code generator 144 in module 100. Following this initial synchronization, each of the side frequency modules, for example modules 200 and module 300, will acquire and track a side frequency component according to the nominal frequency of the phase locked loops contained therein. In the case of module 200 in FIGURE 2A, the nominal frequency may be 2140 c.p.s. and this side frequency component will then be tracked following the procedure set forth above for center frequency module 100. Module 200 will have similar corresponding outputs of: (1) a signal proportional to the amplitude of the side frequency component appearing at terminal 227 and output terminal 202; and (2) a phase delay signal derived from PN code generator 244 in frame logic means 245 that is connected to phase output terminal 203. The phase and amplitude of the output signals from the side frequency modules will vary with respect to the output signals from center frequency module 100 in accordance with the characteristics of the data channel and a comparison with the signals provided from center frequency module 100 will define the differential amplitude and delay characteristics of the channel.

In FIGURE 2B a frequency translation meter 34 is energized from multiplier 40. Multiplier 40 is operative to multiply the frequency of a local tuning fork oscillator, that is provided to operate at the frequency of the center frequency component of the "probe" signal, and frequency of phase locked lop 113 in center frequency module 100. The difference between these signals appears as a direct current potential of varying magnitude which is filtered in low pass filter 44 and applied to frequency meter 34 to directly indicate the frequency translation that has occured on transmission of a "probe" signal through the data channel.

The phase difference existing between the center frequency component and, for example, the side frequency component detected by module 200, is found by positioning the movable contacts in switch assembly 52 in the position shown in FIGURE 2B. The symmetrical square waves provided by frame logic means 145 and 245, proportional to each 15 bit frame in the PN code generators, are compared in multiplier 58. Multiplier 58 may be, for example, one of many types of phase comparators found in the prior art. The output of multiplier 58 consists of a DC potential having a magnitude proportional to the delay between the center frequency reference component and the side frequency component. The DC potential is passed through low pass filter 60 and applied to phase shift indicator 35 to indicate directly the phase shift between the center frequency reference component and the side frequency component.

To determine the attenuation characteristics of the channel, difference amplifier 68 is connected to terminal 127 on center frequency module 100 and the movable contact on switch assembly 53 is connected to stationary contact 53C that is in turn connected through output terminal 202 on module 200 to terminal 227 therein. The amplitudes of the signals are directly compared and the resultant difference output is supplied to difference amplifier 64 wherein it is compared with the phase delay signal that has been suitably weighted, and the difference between these two signals provides an indication of the relative attenuation of the side frequency component with respect to the center frequency component.

It is contemplated that other forms of signal comparing apparatus may occur to those skilled in the art upon becoming familiar with our invention so that the entire transmission characteristics of the channel might be simultaneously displayed on, for example, a cathode ray tube indicator (not shown).

It may therefore be noted that the indicators 34, 35, and 36 and the indications which may be provided from alarm means 37 in response to the several signals supplied thereto, will adequately display the transmission characteristics of the data channel to provide a continuous, non-interfering display of the quality and status of the data channel to which our apparatus is connected.

It is to be understood that other modifications and embodiments of our invention will become apparent to those skilled in the art upon becoming familiar with the principles of our invention as described in the embodiment illustrated above, and that the scope of our invention is to be governed solely by the appended claims.

We claim:

1. Data channel monitoring apparatus comprising, in combination:
- (a) a source of signal comprised of a plurality of frequency components, each characterized according to a predetermined pattern;
- (b) means connecting said source of signal to a data channel to be monitored; and
- (c) receiving means connected to said channel, said receiving means including means responsive to a received signal, providing a plurality of signals related to the frequency components of said source of signal wherein the means responsive to the received signal includes a variable frequency source of signal characterized according to the predetermined pattern of the source of signal.

2. The apparatus of claim 1 in which comparing means are connected to the plurality of signals provided by the means responsive to the received signal.

3. The apparatus of claim 1 in which the plurality of signals are connected to an amplitude comparing means and the variable frequency sources of characterized signal in the receiving means are connected to a phase comparing means.

4. The apparatus of claim 1 in which the means responsive to the received signal in the receiving means includes a plurality of adaptive filters, each responsive to one of the frequency components in the signal.

5. The apparatus of claim 4 in which the filters include means responsive to a variable frequency characterized signal in the receiving means and the received signal for detecting frequency translation components of said received signal.

6. The apparatus of claim 5 in which the receiving means includes means for comparing the amplitudes of one of the detected frequency components with each of the other of the detected frequency components.

7. The apparatus of claim 5 in which the receiving means includes means for comparing the phase relationship of the variable frequency characterized signals in one of said filters with each of the characterized signals in the others of said filters.

8. Apparatus for monitoring a data channel comprising in combination:
- (a) means for providing a plurality of signals, each of predetermined frequency distributed across a band of frequencies related to the bandwith of a data channel;
- (b) means for characterizing each of the signals to provide a composite characterized signal;
- (c) means for applying said characterized signal to a transmitting terminal of a data channel to be monitored;
- (d) means for receiving said characterized signal at a receiving terminal of a data channel to be monitored;
- (e) means for independently providing a source of characterized signal at said receiving terminal;
- (f) means for combining the received composite characterized signal with said last named means to provide a plurality of signals related to said first named signals; and
- (g) means for comparing the wave characteristics of said last named plurality of signals to provide a measure of data channel quality.

9. In apparatus of the class above described, the combination comprising:
- (a) a data handling system including transmitting means and receiving means;
- (b) first source means for providing signals of predetermined frequencies distributed across a band of frequencies corresponding to the operating characteristics of said data systems, one of said signals comprising a reference signal having a frequency related to the operating characteristics of said system at which a minimum of distortion occurs;
- (c) second source means for providing a coding signal;
- (d) means combining the output of said first and second source of means to provide a composite, spread-spectrum monitoring signal; psuedo-random in nature and of relatively low energy content;
- (e) means connecting said signal to said transmitting means;
- (f) a plurality of sources of variable frequency coding signal;
- (g) control means connected to each of said sources of variable frequency coding signal and said receiving means, each of said control means including means responsive to the frequency of one of the signals in said monitoring signal and the source of variable frequency coding signal for providing frequency synchronism therebetween, said control means further including means for providing signals related to the frequency and amplitude of said signal in said monitoring signal; and
- (h) means, connected to said control means, for comparing said signals related to the frequency and amplitude so as to provide an indication of the transfer characteristics of said channel.

10. Apparatus for providing an indication of the condition of a data link wherein a transmitter source for the data link includes characterized signals of different frequencies which are non-interfering with the data being transmitted comprising in combination:

first signal detection means for detecting signals of a first frequency including a first variable frequency characterizing means for generating a first signal having the same characterization as one of the characterizing signals being transmitted and of substantially the same frequency;

phase locked loop means for comparing the incoming signal from the data link with the first signal and providing a control output to synchronize the variable frequency signal characterizing means with the received signal, and output means providing a second signal indicative of the first signal;

second signal detection means for detecting signals of a second frequency including a second variable frequency characterizing means for supplying a third signal having the same characterization as another of the characterizing signals being transmitted and of substantially the same frequency, phase locked loop means for comparing the incoming signal from the data link with the third signal and providing a control output to synchronize the second variable frequency signal characterizing means with the received signal, and output means providing a fourth signal indicative of the third signal; and means for comparing the second and fourth signal output of said first and second detection means to provide an indication of data link characteristics.

11. Apparatus claimed in claim 10 wherein means are included for providing an indication of phase shift and attenuation between the first and second signals.

References Cited

UNITED STATES PATENTS

| | | | |
|---|---|---|---|
| 2,692,307 | 10/1954 | Ketchledge | 179—175.3 |
| 2,924,703 | 2/1960 | Sichak et al. | 325—31 |

THOMAS A. ROBINSON, *Primary Examiner.*

U.S. Cl. X.R.

179—175.3; 325—31